United States Patent Office 3,301,710
Patented Jan. 31, 1967

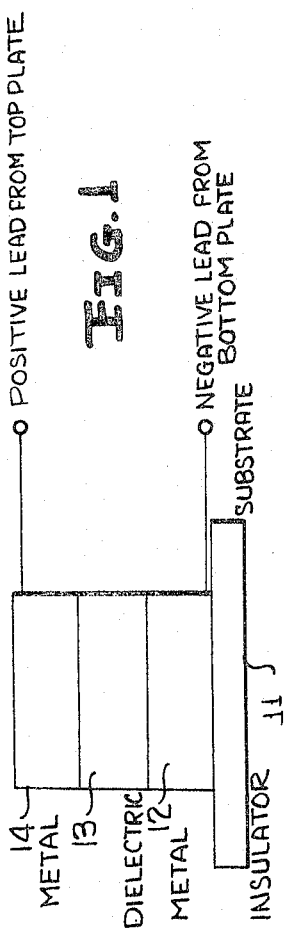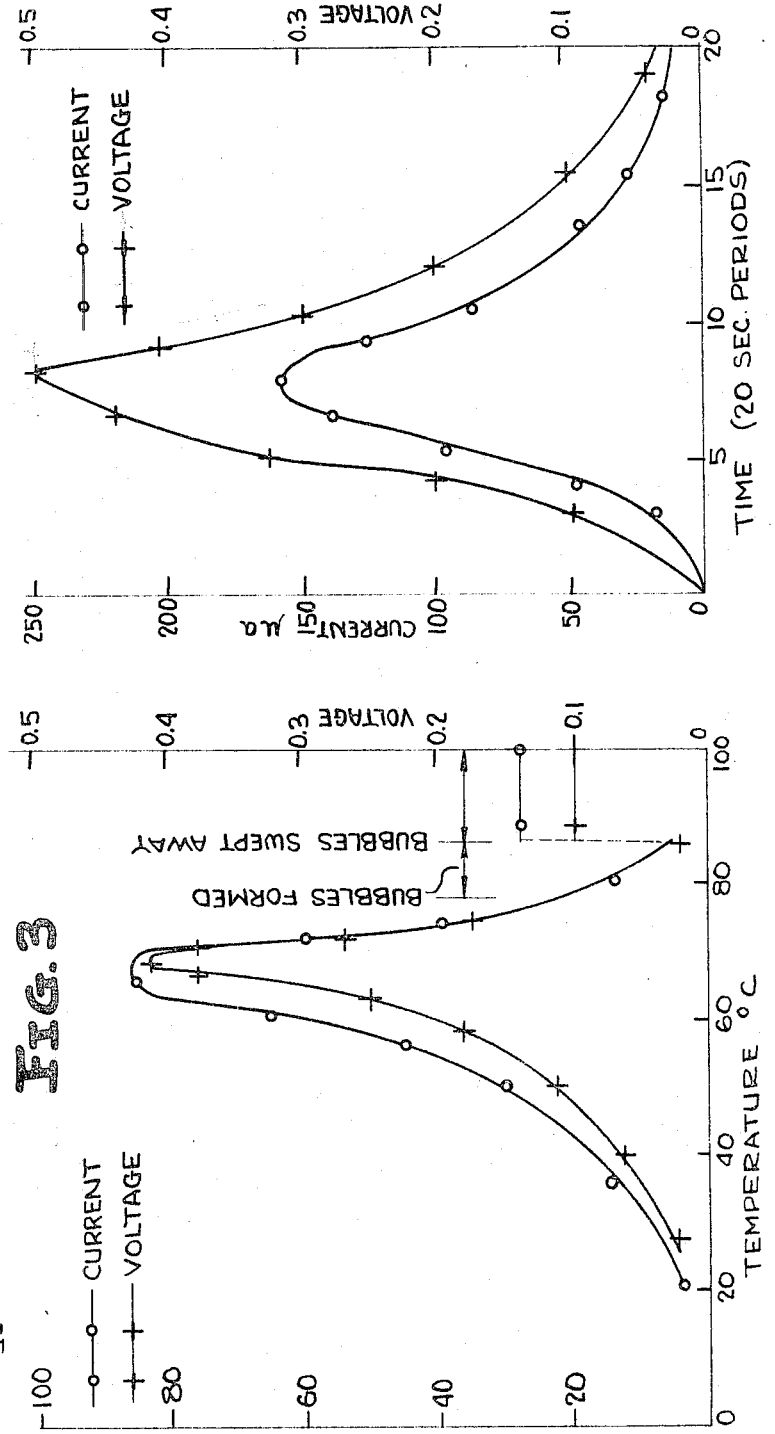

3,301,710
HYDROACTIVATED GALVANIC CELL
Michael Hacskaylo, Falls Church, Va., assignor to Melpar, Inc., Falls Church, Va., a corporation of Delaware
Filed Feb. 4, 1964, Ser. No. 342,503
4 Claims. (Cl. 136—90)

The present invention relates generally to batteries and more particularly to thin film circuitry having layers adapted to generate galvanic currents in response to the application of a hydrating medium.

Thin film electronic circuits comprise an insulating substrate on which are deposited, usually by vapor deposition, layers of conducting, semiconducting and insulating materials to form desired circuit configurations. The layers are very thin, having widths usually never greater than approximately 100 microns. These circuits have always previously been activated by power sources external to the substrate.

According to the present invention, a source of galvanic current is provided from a thin film configuration applied directly to the insulating substrate. The battery, prior to activation by hydration, is in the form of a capacitor having a solid state, non-water soluble, dielectric sandwiched between a pair of solid, thin metal films that function as the battery terminals. One of the films is deposited directly on the substrate as a bottom layer. It is an easily oxidized metal, such as aluminum. The top, solid metal layer must be so narrow that it is porous to water vapor and/or liquid. The non-soluble dielectric, which in a preferred embodiment is cerium oxide, is believed to function as an electrolyte when water molecules are applied thereto through the porous, top layer.

In response to the application of water, experimental observations indicate that reduction occurs at the interface between the top electrode and the dielectric layer while the bottom layer is oxidized. In consequence, the top layer may be considered as the cathode or positive terminal of a battery and the bottom layer as the anode or negative battery terminal.

It is accordingly an object of the invention to provide a thin film configuration adapted to generate galvanic currents.

Another object of the invention is to provide a new and improved power source particularly adapted for utilization with thin film circuits.

A further object of the invention is to provide a new and improved battery having a solid capacitor configuration prior to its activation by fluid.

Still another object of the invention is to provide a battery including a plurality of thin films deposited on an insulating substrate carrying a thin film circuit.

The above and still further objects, features and advantages of the present invention will become apparent upon consideration of the following detailed description of one specific embodiment thereof, especially when taken in conjunction with the accompanying drawings, wherein:

FIGURE 1 is a side sectional view of a preferred embodiment of the battery of the present invention; and
FIGURES 2 and 3 illustrate performance characteristics of the battery of the present invention.

Reference is now made to FIGURE 1 of the drawings wherein an insulating thin film, amorphous substrate 11, which typically is quartz, has deposited thereon in the order named, layer 12 of oxidizable metal, a solid dielectric layer 13 that is water insoluble, and a top, solid plate 14 which is so thin as to be porous to water. Connections between the top and bottom layers 14 and 12 and the remainder of the circuit (not shown) on substrate 11 are formed by pressure clips or platinum wire leads fused to substrate 11. In a preferred embodiment, layers 12 and 14 are aluminum while the dielectric between them is cerium oxide ($CeO_2$). Dielectric layer 13 separating the metal plates 12 and 14 of the capacitor has a maximum thickness of approximately 2.5 microns while the thickness of dielectric layer 12 is between 0.1 and 3 microns. In contrast, plate 14 has a thickness between 300 A. and 3000 A. to meet the requirement regarding water porosity.

In other embodiments, top plate 14 can be porous gold or platinum, dielectric layer 13 lead chloride ($PbCl_2$), and the bottom layer any one of a plurality of oxidizable metals, e.g., chromium, nickel or zinc.

During battery operation, water is applied through porous film 14 in vapor or liquid form. This can be accomplished by immersing the unit in a distilled water bath or by subjecting it to a very humid atmosphere. In response to hydration, a positive voltage is generated at plate 14 relative to plate 12. As shown infra, this voltage is believed to be generated as a result of hydrolysis of a cerium compound or of elemental cerium as well as the formation of $Al(OH)_3$ at the interface between layers 13 and 14. It is postulated that the reaction at the interface between layers 13 and 14 causes reduction of aluminum in the top plate 14 and oxidation of bottom aluminum layer 12.

Generally known vacuum deposition techniques are utilized to deposit layers 12–14 on substrate 11. In forming the dielectric layer, the starting material is $CeO_2$. The residue of the starting material after thermal vaporization was Ce with no traces of $CeO_2$.

To test the properties of $CeO_2$ film 13, the cell comprising layers was immersed in distilled water. After considerable galvanic action took place, it was found that the water in which the cell was immersed became significantly alkaline, having a pH of approximately 8. The starting $CeO_2$ and the residue of the starting $CeO_2$ were separately immersed in different containers of distilled water. The pH of water containing the starting $CeO_2$ increased only by a very slight amount while the water containing the residue had a pH of about 8. The increased pH of the solution containing the cell is presumably due to the hydrolysis of a cerium compound (or metal) as well as the formation of $Al(OH)_3$ at the interface between layers 13 and 14.

Some of the other properties of the capacitor fabricated with the $CeO_2$ dielectric 13 sandwiched between Al electrodes 12 and 14, are now stated. Moisture from a hand cupping the cell was sufficient to generate an open circuit voltage of 0.1–0.2 volts, and a short circuit current density of about 30 $\mu a./cm.^2$. When a drop of water was placed on the top electrode of another Al–$CeO_2$–Al sample, there were measured an open circuit voltage of 0.8 volts and a short circuit current density of 350 $\mu a./cm.^2$. This energized battery was connected across a 5000 ohm load resistor and then placed on a hot plate.

FIGURE 2 provides indications of current and voltage plotted against a number of 20 second testing intervals for a cell having a drop of water placed on its top electrode 14. The voltage and current increased with temperature until the sample began to dry. The output power decreased to zero when the film was completely dry from a maximum output power that occurred at 160 $\mu a./cm.^2$ at 0.5 volt. When this sample was heated without water after the film had dried, no battery action was detected.

The sample was immersed in a beaker of distilled water and heated after the film had dried. The currents and voltages generated were then recorded as a function of temperature with the results being shown in FIGURE 3. The voltage and current were both maximum at about 68° C., with values of 0.42 volt and 85 μa./cm.², respectively. Steady decreases in voltage and current were noted from 68° C. to 85° C. As the temperature increased beyond 85° C., the vapor bubbles that had formed on the top surface of layer 14 started to leave, thus permitting the voltage and current to increase suddenly and thereafter remain constant at 0.1 volt and 28 μa. At the boiling temperature of water (100° C.), the voltage and current remained unchanged for approximately 15 minutes, after which time galvanic action ceased. The total time of galvanic action of this cell under the changing temperature conditions indicated by FIGURE 3 was approximately 2.5 hours. Another Al–CeO₂–Al capacitor was immersed in distilled water at ambient temperature, 25° C. This sample exhibited galvanic action for 65 hours at 0.32 volt with a current variation of 18 to 25 μa./cm.².

Visual observations of several capacitors after immersion in distilled water indicate that the top electrodes showed some degree of metal depletion as well as formation of "bubbles" that were approximately ½ mm. in diameter. The bottom aluminum electrode changed from a metallic to a milky, translucent appearance. In analyzing the dielectric films of several capacitor configurations by X ray diffraction techniques, no elemental cerium could be found and each film exhibited CeO₂ lines.

A number of capacitors were made in which the metal layer thicknesses were varied, and the gold and aluminum electrodes were interchanged. The galvanic effects corresponding to these variations are shown in Table I, at the end of the present specification. When galvanic action was detected, it was observed visually that the water had permeated, i.e. completely wetted, the top aluminum plate. The observations confirm that diffusion of water through the top plate is apparently necessary for galvanic action, since a thick top plate (2.5μ) did not exhibit the galvanic effect nor diffusion of water.

Galvanic action is noted when gold (a non-oxidizable metal) is the top electrode, but not when gold is the bottom electrode. In contrast, aluminum (an oxidizable metal) can be used for either of the electrodes. These observations seem to indicate that reduction occurs at the top plate, and oxidation occurs at the bottom plate.

An exact analysis of the chemical reactions within the films is very difficult due to thinness of the films. One may, however, postulate some reasonable reactions. In the presence of water, the following assumptions for the electrolytic action of the Al–CeO₂–Al capacitor are made, presuming some elemental Ce in the dielectric layer 13. (This presumption is believed valid despite its apparent contradiction by the experimental findings, noted supra.) At the top electrode, the water-aluminum reaction is believed to be expressed accurately as $$2Al + 6H_2O \rightarrow 2Al(OH)_3 + 3H_2$$

The CeO₂ film apparently becomes an effective electrolyte only in the presence of water. From a consideration of the oxidation-reduction potentials of cerium and its compounds, as well as of aluminum and its compounds, reduction of Al(OH)₃ by Ce metal can occur at top electrode 14 and oxidation of Al by CeO₂ can occur at bottom electrode 12. This oxidation-reduction reaction, however, does not hold for a gold top electrode due to the stability of gold. However, top electrode 14 may serve as a conductor between possible localized reduction reactions in film 13, and oxidation reaction at bottom Al plate 12. When the bottom plate was Au and the top plate was Al, the galvanic effect was not experimentally detected. However, it is assumed that if the water could completely permeate the CeO₂ film 13, the effect would be detected and a reversal of polarity would be observed. While the chemical reactions that have been described here may not be the correct ones, they are plausible for a possible explanation for the galvanic effect in thin films.

One cannot determine at present the expected potential of the cell based on chemical reactions and free energy considerations because the electrolyte concentrations, activities, and the true chemical reactions are not known.

The galvanic effect was also observed in a vacuum deposited PbCl₂ film sandwiched between aluminum electrodes. When water was placed on top electrode 14, an open circuit voltage of 0.6 volts and a large short circuit current density of about 1000 μa./cm.² were observed. The capacitor, however, deteriorated within several minutes with significant decomposition of plate 14 and a cessation of battery action.

TABLE I

GALVANIC CHARACTERISTICS OF VACUUM DEPOSITED THIN FILM CAPACITORS WITH VARIOUS MATERIALS AND THICKNESSES

| Bottom Electrode | | Dielectric CeO₂ | Top Electrode | | Open Circuit Voltage, Volts | Short Circuit Current Density, μa./Cm.² |
|---|---|---|---|---|---|---|
| Material | Thickness, A. | Thickness, Microns | Material | Thickness, A. | | |
| Al | 1,600 | 1.0 | Al | 300 | 0.48 | 30 |
| Al | 3,000 | 1.5 | Al | 550 | 0.80 | 120 |
| Al | 1,400 | 1.5 | Al | 1,000 | 0.48 | 85 |
| Al | 4,500 | 0.8 | Al | 6,000 | 0.80 | 350 |
| Al | 300 | a 1.5 | Al | 1,070 | 0.35 | 75 |
| Al | 300 | 1.9 | Al | 1,070 | 0.23 | 30 |
| Al | 2,000 | 1.4 | Al | 25,000 | 0.00 | 0 |
| Al | 2,800 | 3.0 | Au | 300 | 0.62 | 160 |
| Al | 5,000 | 1.1 | Au | 600 | 0.60 | 140 |
| Au | 2,100 | 0.9 | Au | 300 | 0.00 | 0 |
| Au | 2,500 | 1.0 | Al | 500 | 0.00 | 0 | a Sample heated to 500° C. in air for 45 minutes prior to top plate deposition.

While I have described and illustrated one specific embodiment of my invention, it will be clear that variations of the details of construction which are specifically illustrated and described may be resorted to without departing from the true spirit and scope of the invention as defined in the appended claims.

I claim:
1. A thin film battery for generating an electrical output upon exposure to water or water vapor, comprising a positive electrode in the form of a metallic film porous to water molecules and having a thickness in the range from about 300 A. to about 3000 A., a water-insoluble solid electrolytic film of less than approximately 2.5 microns in thickness composed of a metal compound that undergoes a hydration reaction with water, said metal compound selected from the group consisting of cerium oxide and lead chloride, and a negative electrode in the form of an oxidizing metal film having a thickness in the range from approximately 0.1 to approximately 3 microns, said negative electrode film selected from the group consisting of aluminum, zinc, nickel and chromium; said electrolytic film interposed between said positive and negative electrode films.

2. The invention according to claim 1 wherein said positive electrode metallic film is selected from the group consisting of aluminum, gold, and platinum.

3. A thin film galvanic cell comprising a metal electrode porous to water molecules and having a thickness of less than approximately 3000 Angstroms, an oxidizable metal electrode of less than about 3 microns in thickness selected from the group consisting of aluminum, zinc, nickel and chromium, and a dielectric film selected from the group consisting of cerium oxide and lead chloride having a thickness of approximately 2.5 microns or less and responsive to water penetrating said porous electrode to maintain current flow between said electrodes.

4. The invention according to claim 3 wherein said porous electrode is composed of a metal selected from the group consisting of aluminum, gold and platinum.

References Cited by the Examiner

UNITED STATES PATENTS

| | | | |
|---|---|---|---|
| 2,566,666 | 9/1951 | Khouri et al. | 317—230 |
| 2,696,513 | 12/1954 | Lehovec | 136—153 |
| 3,146,131 | 8/1964 | Linden et al. | 136—86 |
| 3,160,531 | 12/1964 | Spindler | 136—153 |
| 3,234,442 | 2/1966 | Maissel et al. | 317—230 |

JOHN W. HUCKERT, *Primary Examiner.*

JAMES D. KALLAM, *Examiner.*